US006793496B2

(12) United States Patent
Edic et al.

(10) Patent No.: US 6,793,496 B2
(45) Date of Patent: Sep. 21, 2004

(54) MATHEMATICAL MODEL AND A METHOD AND APPARATUS FOR UTILIZING THE MODEL

(75) Inventors: Peter Michael Edic, Albany, NY (US); Harvey Ellis Cline, Schenectady, NY (US); Ahmad Nadeem Ishaque, Clifton Park, NY (US); Mehmet Yavuz, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/085,726

(22) Filed: Feb. 28, 2002

(65) Prior Publication Data

US 2002/0127523 A1 Sep. 12, 2002

Related U.S. Application Data

(62) Division of application No. 09/448,353, filed on Nov. 23, 1999, now abandoned.
(60) Provisional application No. 60/129,399, filed on Apr. 15, 1999.

(51) Int. Cl.[7] .............................................. G09B 23/28
(52) U.S. Cl. ...................................... 434/262; 434/267
(58) Field of Search ................................ 434/262, 267, 434/272, 188; 703/2, 11

(56) References Cited

U.S. PATENT DOCUMENTS

| | | | | |
|---|---|---|---|---|
| 3,904,289 A | | 9/1975 | Yager | 353/122 |
| 4,797,842 A | * | 1/1989 | Nackman et al. | 716/20 |
| 5,273,038 A | * | 12/1993 | Beavin | 600/416 |
| 5,581,489 A | * | 12/1996 | Groothuis et al. | 703/2 |
| 5,583,902 A | | 12/1996 | Bae | 378/8 |
| 5,625,577 A | * | 4/1997 | Kunii et al. | 703/2 |
| 5,687,208 A | | 11/1997 | Bae | 378/8 |
| 5,766,016 A | * | 6/1998 | Sinclair et al. | 434/262 |
| 5,909,380 A | * | 6/1999 | Dubois et al. | 703/11 |
| 5,923,573 A | * | 7/1999 | Hatanaka | 703/2 |
| 5,947,899 A | | 9/1999 | Winslow | 600/410 |
| 6,047,080 A | | 4/2000 | Chen | 382/128 |
| 6,061,469 A | * | 5/2000 | Walterman | 382/154 |
| 6,161,080 A | * | 12/2000 | Aouni-Ateshian et al. | 703/11 |
| 6,295,464 B1 | * | 9/2001 | Metaxas | 600/407 |
| 6,308,144 B1 | * | 10/2001 | Bronfeld et al. | 703/2 |
| 6,317,704 B1 | * | 11/2001 | Furuhata et al. | 703/2 |
| 6,324,243 B1 | | 11/2001 | Edic et al. | 378/4 |
| 6,353,653 B1 | | 3/2002 | Edic | 378/8 |
| 6,374,198 B1 | * | 4/2002 | Schifa et al. | 703/2 |
| 6,538,634 B1 | * | 3/2003 | Chui et al. | 345/156 |

* cited by examiner

*Primary Examiner*—Kurt Femstrom
(74) *Attorney, Agent, or Firm*—Donald S. Ingraham; Patrick K. Patnode (57) ABSTRACT

The present invention provides a model and a method and apparatus for utilizing the model to simulate an imaging scenario. The model is mathematically defined by analytical basis objects and/or polygonal basis objects. Preferably, the model is a model of the human heart and thorax. Polygonal basis objects are only used to define structures in the model that experience torsion, such as certain structures in the heart that experience torsion during the cardiac cycle. The manner in which the basis objects comprising the model are transformed by scaling, translation and rotation is defined for each basis object. In the case where a basis object experiences torsion, the rotation of the basis object will change as a function of the length along the axis of the basis object about which rotation is occurring. During an imaging system simulation, the model is utilized by a forward projection routine, which integrates the linear attenuation coefficients associated with the rays emitted by a simulated x-ray source and collected by a simulated detector array to obtain line integrals corresponding to forward projection data. The forward projection data is then processed to take into account the physics of the imaging technology, the x-ray source and the detector array. The processed projection data is then processed and back-projected by a reconstruction modeling routine to produce a reconstructed representation of the model of the heart as a function of time.

17 Claims, 4 Drawing Sheets

MATHEMATICAL MODEL AND A METHOD AND APPARATUS FOR UTILIZING THE MODEL

This application is a division of application Ser. No. 09/448,353, filed Nov. 23, 1999, now abandoned, which claims the benefit of provisional application 60/129,399 filed Apr. 15, 1999, which is hereby incorporated by reference in its entirety.

BACKGROUND OF THE INVENTION

The present invention relates to a mathematical model and a method and apparatus for utilizing the model. More particularly, the present invention relates to a model, such as a model of the human heart and thorax, that can be used as a tool to improve the manner in which medical imaging techniques are performed in order to enable the occurrence of artifacts in reconstructed images acquired through these techniques to be reduced or eliminated. The present invention also relates to the method and apparatus for utilizing the model in an imaging system simulation.

When using x-ray CT to acquire x-ray projection data to be used in reconstructing an image of human anatomy, it is necessary that the patient not move during the scanning interval. If the patient moves, the x-ray projection data set will be inconsistent in mathematical terms, which will result in image artifacts appearing in the reconstructed images. Generally, the back-projection process used in CT reconstruction smears filtered projection data across a reconstruction grid at each view angle where data is acquired. If the data set is mathematically consistent, i.e., acquired from a stationary object, constructive interference of the back-projected data will result in features appearing in the reconstructed image, while destructive interference will result in features being eliminated in the reconstructed image. If the patient moves during the scanning process, the interference patterns will be altered, thereby resulting in image artifacts appearing in the reconstructed image.

In some instances, it is difficult or impossible for the patient to remain stationary. Respiratory motion can be minimized by having the patient hold his or her breath. However, cardiac motion cannot be reduced. As a result, image artifacts occur in reconstructions of the heart and surrounding tissue. One method that is used to reduce such artifacts is to decrease the scanning time. However, decreasing the scanning time may result in significantly increasing system complexity and cost. A better, and yet unexplored, solution would be to optimize existing hardware and algorithms to improve the temporal resolution of reconstructed images. Once an understanding of the system design tradeoffs are evaluated, it would be possible to make system improvements without having to design new complex and costly systems.

Since patients' heart rates and electrocardiograms (ECG) vary significantly from patient to patient, it would be useful to devise a mathematical four-dimensional (4-D) (i.e., 3-D spatial and 1D temporal) model of the heart and surrounding tissue in the chest that could be used in research to determine the manner in which the heart should be imaged in order to improve the quality of the reconstructed images. Using such a model in a simulation of an imaging system, such as a CT system, would allow the motion of the heart to be controlled in a systematic way, thereby enabling the performance of the imaging system to be quantified. The model could also be used in the simulations to identify the nature of the image artifacts, which would facilitate the development of various data preprocessing algorithms that would reduce or eliminate such artifacts.

One approach that has been used to generate a 4-D model of the heart is to acquire patient data, generate a 3-D reconstruction of the chest enclosing the heart at various times during the cardiac cycle, segment the reconstructions, and generate surfaces that comprise the anatomy of the heart. The reconstructions at various instants in time are then combined to generate a 4-D model of the heart. Using these techniques, the ventricular and atrial chambers, as well as major vessels (Vena Cava Caudal, Vena Cava Cranial, Aorta, pulmonary veins, pulmonary arteries) connected to the heart, could be segmented.

One disadvantage of this technique is that since the data is acquired from an actual patient over a specified time interval, it is difficult, if not impossible, to determine fine structures in the anatomy of the heart due to cardiac motion. For instance, coronary vessels are difficult to segment and/or are difficult to determine from the reconstructed volumes. One primary application in cardiac imaging is the assessment of stenosis in coronary arteries. If the extent of the stenosis could be reliably identified and quantified, the clinical impact on patient diagnosis and/or treatment could be significant. The aforementioned modeling technique is limited in this regard.

Accordingly, a need exists for a model of the heart that overcomes the deficiencies associated with the aforementioned model. More particularly, a need exists for a model of the heart that is based on mathematical basis objects, rather than on actual data acquired from a patient. The basis objects mathematically define the structure of the model to thereby enable an accurate 4-D representation of the heart to be generated. The model can be used in imaging system simulations to optimize data acquisition protocols and data processing algorithms so that the motion of the heart can be "frozen" to prevent imaging artifacts from occurring in the reconstructed image.

BRIEF SUMMARY OF THE INVENTION

The present invention provides a mathematical model and apparatus for utilizing the model to simulate an imaging scenario. The model is comprised of basis objects, each basis object being defined by a mathematical function. Each basis object has a spatial relationship to the other basis objects, the basis objects and the spatial relationship defining a three-dimensional geometry of the model. The model is stored on a computer-readable medium and is capable of being transformed by one or more transformation operations, each transformation operator corresponding to a predetermined transformation operation, wherein when one of the transformation operators operates on one of the basis objects, the spatial relationship between the basis object that is operated on at least one other basis object is varied, thereby causing the geometry of the model to be varied.

These and other features and advantages of the present invention will become apparent from the following description, drawings and claims.

DETAILED DESCRIPTION OF THE INVENTION

In accordance with the present invention, a 3-D mathematical model is generated using basis functions that mathematically define the structure of the model. Motion may then be applied to the 3-D model to produce a 4-D model. The phrase basis objects is intended to mean that the objects form the basis of the structures that they define. Essentially, the basis objects are the building blocks for the structures that define the model. The model may be comprised entirely of analytical basis functions or it may be comprised entirely of polygonal basis functions. Alternatively, the model may be comprised partially of analytical basis functions and partially of polygonal basis functions. In accordance with the preferred embodiment of the present invention, the model is comprised mostly of analytical basis functions, but uses polygonal basis functions to define structures in the model to which torsion is applied, as described below in detail.

The model preferably is a model of the human heart and thorax. However, the model is not limited to being a model the heart and thorax. The present invention can be used to model other dynamic structures in a living creature, as well as inanimate objects. The model is mathematically defined by analytical basis objects and/or polygonal basis objects. Polygonal basis objects are used to define structures in the model that experience torsion during the cardiac cycle. The manner in which the basis objects comprising the model are to be transformed by scaling, translation, rotation and/or torsion is defined for each basis object for certain points in time. In the case where a basis object experiences torsion, the rotation of the basis object will change as a function of the position along the axis of the basis object about which rotation is occurring.

The model may be used by system simulation tools that mimic the process of data acquisition in an imaging system during one or more points in time in order to reconstruct an image of the model at the points in time to produce a 4-D reconstructed model.

In accordance with the preferred embodiment of the present invention, the model is a model of the human heart and thorax. Therefore, the following detailed discussion of the present invention will be directed to the manner in which the model of the human heart and thorax is generated and utilized during an imaging simulation. However, those skilled in the art will understand that the model may be used to model other anatomical structures. It will also be understood that the model of the present invention could also be used to model inanimate objects. Those skilled in the art will understand the manner in which the principles of the present invention may be applied to model objects other than the human heart and thorax.

The analytical basis objects used in the model of the present invention generally are basis objects that can be mathematically defined by quadratic equations, which means that the equations that define the objects are second order equations that can be manipulated as such. Polygonal basis objects are basis objects that are mathematically defined as polygons. Polygons are closed-plane figures defined by three or more sides. An example of a polygon is a triangle. In order to provide the model with motion, the basis functions are manipulated by operators that shift, scale and rotate the basis functions.

Generally, it is less computationally intensive to perform these operations on analytical basis functions than it is to perform them on polygonal basis functions. Therefore, it is preferable to define the basis functions of the model analytically. However, analytical basis functions cannot be used where torsion is required because torsion cannot be defined as a constant geometric transformation that operates on the entire object due to the fact that the rotation operator changes as a function of position along the axis about which the rotation is occurring. Therefore, polygonal basis functions will be used to define structures of the model that are subjected to torsion. However, it should be noted that in cases where the 4-D model of the heart is used to simulate stages of the cardiac cycle during which torsion is not experienced, the 4-D model can be comprised solely of analytical basis functions.

Figure 1:
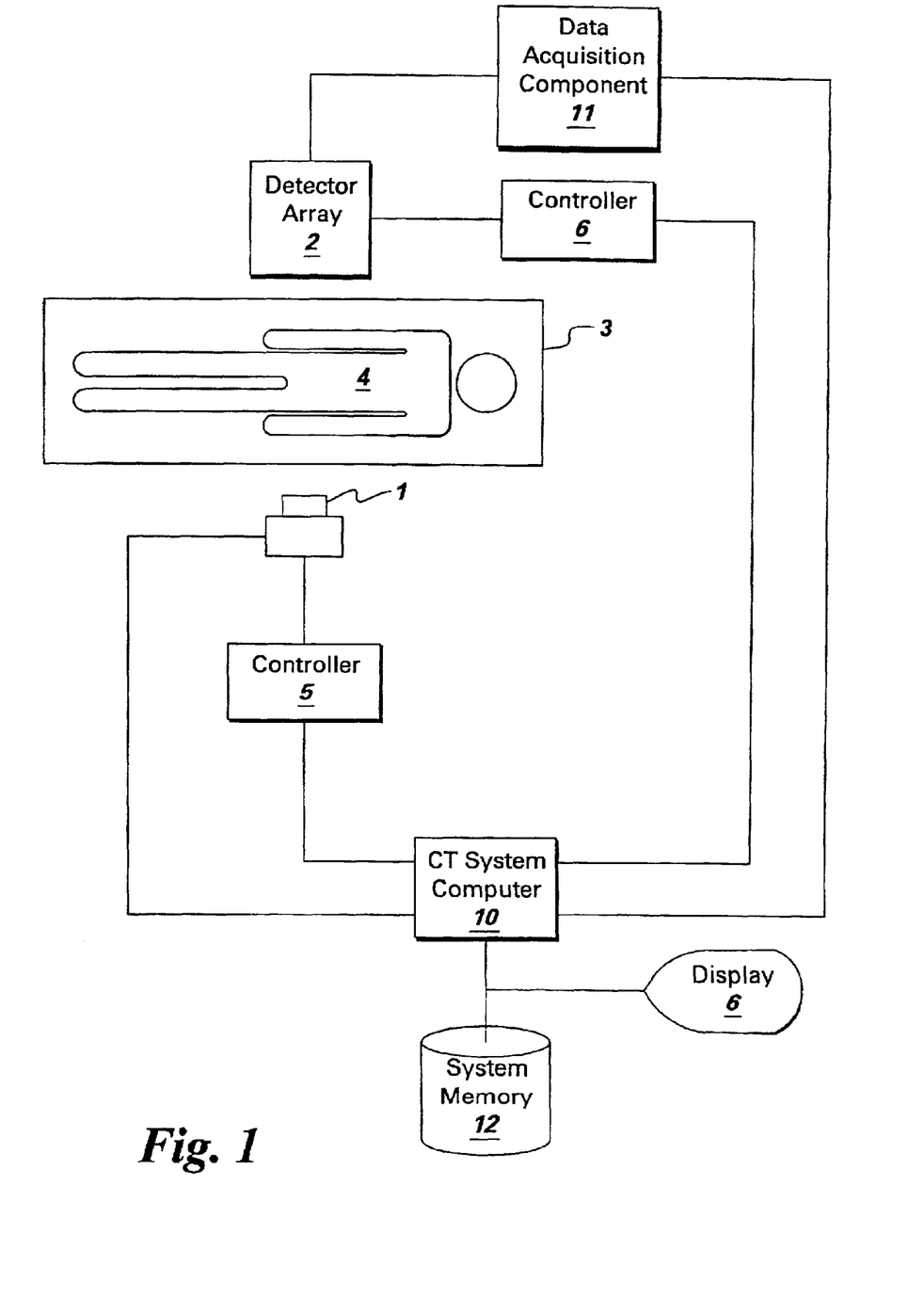
FIG. 1 is a block diagram of a typical CT system that can be simulated while using the model of the present invention to simulate the heart.

Prior to describing the model and the manner in which it is used during simulation of a CT system, the components of a typical CT system and the manner in which they operate will be generally described with reference to the CT system shown in FIG. 1. The CT system comprises a gantry that comprises an x-ray tube 1 that emits x-rays and a detector array 2 that collects x-rays emitted by the x-ray tube. A table 3 supports a patient 4 while the gantry rotates about the patient during a data acquisition period as x-rays are projected through the patient by the x-ray tube 1 and collected by the detector array 2. Rotation of the gantry means that the x-ray tube 1 and/or the detector array 2 is rotated, which depends on whether the CT system is a third or fourth generation CT system, as will be understood by those skilled in the art.

The controllers 5 and 6 are controlled by the CT system computer 10 and are coupled to the x-ray tube 1 and to the detector array 2, respectively. The controllers 5 and 6 cause the appropriate relative rotational motion to be imparted to the x-ray tube 1 and/or to the detector array 2. Although the controllers 5 and 6 are shown as separate devices in FIG. 1, a linkage may be established between x-ray source 1 and detector 2 such that one controller is used to impart motion to the gantry. The detector array 2 may be one of several different types of detector arrays, depending on the type of CT system and the data acquisition protocol being used. For example, a single-slice CT system uses a detector array comprising a single row of detector elements. A multi-row CT system uses a detector array comprising a few rows of detector elements. A volumetric CT system uses an area detector comprising hundreds of rows of detector elements. Any of these CT systems can be used to acquire the necessary CT radiograph data.

The data acquisition protocol will be different in each of these cases. Those skilled in the art will understand the manner in which any of these types of CT systems and the associated data acquisition protocol may be simulated. The computer 10 controls the data acquisition component 11 to thereby control the sampling and digitization of the CT radiograph data collected by the detector array 2. The computer 10 stores the CT radiograph data in the memory device 12. The computer 10 reads the CT radiograph data out of the memory device 12, processes the data in accordance with a reconstruction algorithm and displays the reconstructed image on the display monitor 13.

The model of the present invention can be used to generate projection data that is suitable for use by a simulation routine that simulates an imaging system, such as, for example, an x-ray CT system. The present invention can be used to simulate any imaging system that generates integrals of a physical property of the object being imaged along straight lines that traverse the object. Prior to describing the manner in which the model of the present invention is constructed, the manner in which the model may be utilized in a CT system simulation will be described with reference to FIG. 2. The manner in which the model itself is constructed will then be described with reference to FIGS. 3–5.

Figure 2:
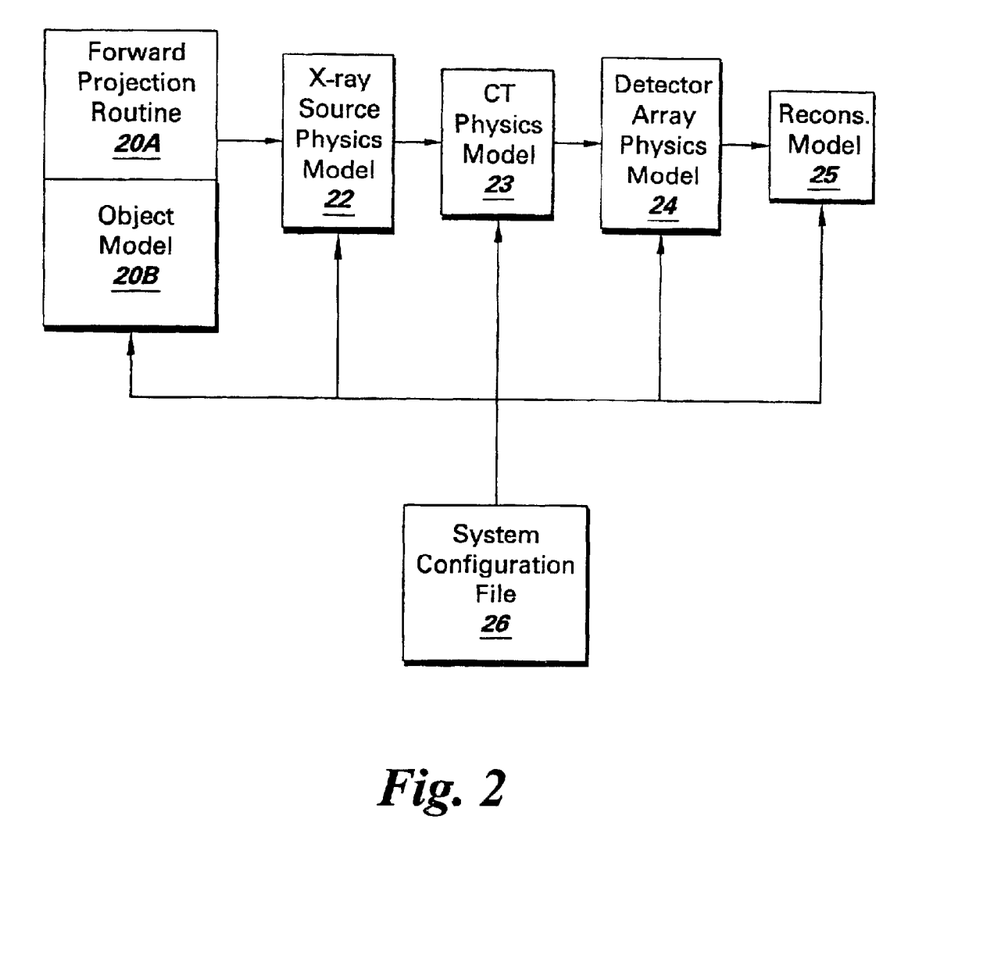
FIG. 2 is a block diagram of a simulated CT system that uses the model of the present invention to simulate the heart during a simulation of the CT system.

FIG. 2 is a block diagram of a simulated CT system that is suitable for utilization of the model of the present invention. A forward projection routine 20A utilizes the model 20B to generate forward projection data. The forward projection data corresponds to integrals of the linear attenuation coefficients associated with the structures that comprise the object model 20B. The integrals correspond to integration of the linear attenuation coefficients along rays that connect the x-ray source to the individual detector elements of the detector array.

The forward projection data is then processed in accordance with the physics of the x-ray source being modeled, the physics of the CT system being modeled and the physics of the detector array being modeled. The routines that generate the x-ray source physics model, the CT physics model and the detector array physics model are represented by blocks 22, 23 and 24, respectively. Generally, the forward projection routine 20A assumes that the x-ray source is an ideal x-ray tube and that it is a point source and shoots rays through the object model toward individual detector elements and determines whether or not the rays intersect the object model. The forward projection routine 20A also assumed that the detector array is ideal. The x-ray source physics model 22, the CT physics model 23 and the detector array physics model 24 then process the projection data by factoring in the physics associated with a non-idealized x-ray tube, CT physics and a non-idealized detector array, respectively.

In essence, these processing steps corrupt the projection data to account for the physics of and the non-ideal nature of these CT system components, as well as CT physics in general. Those skilled in the art will understand that it is possible to incorporate non-idealized processes commonly observed in the x-ray tube, the CT imaging process and the detector into the forward projection routine 20A.

The processed projection data is then processed and back-projected by a reconstruction modeling routine 25 that generates a reconstructed CT image of the heart. As discussed below in detail, motion operators are applied to the object model 20B. Therefore, the object model 20B changes in geometry as a function of time to represent a beating heart. Therefore, the reconstructed model also changes in geometry as a function of time. The reconstructed image of the model can be analyzed to identify the optimal set of operating parameters that are needed for the particular CT imaging application. The reconstructed image of model can also be analyzed to assess the weaknesses and/or strengths of existing CT imaging technology. Furthermore, the geometry of the object model 20B can be frozen at any desired instant in time to thereby enable the 3-D reconstructed model of the heart to be frozen at any desired instant in time. Consequently, no motion artifacts will be contained in the reconstructed image.

A system configuration file 26 contains information relating to the CT system that is utilized by the forward projection routine 20A and by each of the modeling routines 22–25. For example, this information includes information relating to the CT data acquisition protocol, the type of detector array being utilized, the source-to-detector distance, the source-to-center-of-rotation distance, the number of detector elements used, the size of the detector elements used, etc.

As stated above, the model of the present invention is not limited to being used to simulate any particular type of imaging system. Those skilled in the art will understand the manner in which the model of the present invention can be used to simulate imaging systems other than CT systems.

Of course, the models that are used to model the physics of the imaging protocol and of the imaging system components will have to be appropriately selected and/or designed. Those skilled in the art will understand how such physics models can be implemented. With respect to the simulation represented by the block diagram of FIG. 2, it is currently known to utilize routines that model the x-ray source and the detector array as both ideal and non-ideal components and to appropriately factor in CT physics in order to accurately simulate a CT system. Therefore, the manner in which such modeling is accomplished will not be provided herein.

Using analytical basis objects to define the structures that comprise the model of the heart has certain advantages. First of all, computationally, it is a relatively simple task to determine the line integral of the attenuation coefficient of an analytical basis object. In general, the analytical basis objects are described mathematically by quadratic equations. Secondly, using basis objects to describe the structures of the model enables the model to be designed in software as a class hierarchical data/methods structure, which may be written in, for example, the C++ programming language.

The manner in which the projection data is generated by the forward projection routine 20A using the model 20B will now be described. The x, y and z coordinates of a ray connecting the x-ray source to a detector element in the detector array can be parameterized on a single variable. For example, the x, y and z coordinates of the ray can be defined as:

$$X = X_{source} + (X_{detector} - X_{source})*t \quad \text{(Equation 1)}$$

$$Y = Y_{source} + (Y_{detector} - Y_{source})*t \quad \text{(Equation 2)}$$

$$Z = Z_{source} + (Z_{detector} - Z_{source})*t \quad \text{(Equation 3)}$$

where t is in the interval 0 . . . 1, $X_{source}$, $Y_{source}$ and $Z_{source}$ are the x, y and z coordinates, respectively, of the source, and $X_{detector}$, $Y_{detector}$ and $Z_{detector}$ are the x, y and z coordinates, respectively, of the detector element that the ray intersects in the detector array.

These equations can be substituted into the quadratic equations defining a particular basis object of the model to produce quadratic equations that are functions of a single variable only, which is "t" in this case. The quadratic equations can then be solved using the well known quadratic formula. If the ray actually intersects the object, solving the quadratic equation will result in 2 real values of t being generated. The solutions to the quadratic equation represent the value of t where the ray entered the object and where it exited the object. The variable t can be thought of as representing time. For instance, at t=0, the position along the ray corresponds to the position of the x-ray source and at t=1, the position along the ray corresponds to the position of the detector array. However, this notion of time is not to be confused with the temporal component of the 4-D representation of the model 20B. The points of intersection of the rays are then used to determine the integrals of the linear attenuation coefficients along the rays, which correspond to the projection data generated by the forward projection routine 20A.

In order to apply temporal variation to the geometry of the model 20B, known techniques of solid geometry modeling, data visualization, and computer graphics are employed. Each of these techniques typically uses a 4-by-4 matrix to represent the 3-D position (i.e., the position with respect to the x, y and z coordinate axes) of an object in space. The 4-by-4 matrix is a transformation matrix that can be used to transform the object from a local coordinate position to a global coordinate system, and vice versa. The 4-by-4 matrix is defined as the homogenous transformation matrix. The equation that describes this operation is:

$$[x_{global} y_{global} z_{global} 1]^* = [T][x_{local} y_{local} z_{local} 1]^* \quad \text{Equation 4}$$

where $[x_{global} y_{global} z_{global} 1]^*$ is the global coordinate representation of the object, $[X_{local} Y_{local} Z_{local} 1]^*$ is the local coordinate representation of the object, $[T]$ is the 4-by-4 homogeneous transformation matrix, and "*" is used to denote the transpose matrix operation.

The most common transformations are geometric translation along the x, y and z axes; geometric rotation about the x, y and z axes; and scaling along the x, y and z axes. Each of these transformations is represented by a 4-by-4 transformation matrix. One attractive feature of using transformation matrices is that they can be mathematically combined to generate a single transformation matrix that describes the complicated position of the object. For example, the equation:

$$[x_{global} y_{global} z_{global} 1]^* = [T]_{translateX}[T]_{rotateZ}[T]_{scaleY}[x_{local} y_{local} z_{local} 1]^* \quad \text{Equation 5}$$

can be written as:

$$[x_{global} y_{global} z_{global} 1]^* = [T]_{total}[x_{local} y_{local} z_{local} 1]^* \quad \text{Equation 6}$$

where $[T]_{total} = [T]_{translateX}[T]_{rotateZ}[T]_{scaleY}$

If the notion of time is applied to the transformation matrices, then a set of geometric operations can be defined at a particular instant in time. Furthermore, several sets of geometric operations can be defined over several time intervals to describe complicated motion of the object. Then, by interpolating between the transformed positions, complicated, continuous motions of the object can be generated. Those skilled in the art will understand the manner in which these transformations can be performed as a function of time to vary the geometry of the model as a function of time. Those skilled in the art will also understand the manner in which the object model can be provided with continuous motion by interpolating between the transformed positions.

As stated above, the 3-D model of the heart is constructed from a combination of several basis objects. The temporal variation of the heart is implemented by defining the transformation operations that operate on the basis objects during certain time intervals. For instance, suppose that during an interval of the cardiac cycle, the left atrium increases its longitudinal length while the left ventricle shortens its longitudinal length. Since the left atrium is generated by one or more basis objects and the left ventricle is generated by one or more basis objects, the motion of the particular chambers of the heart can be separately defined. In other words, the transformation matrices operating on the left atrium during that particular time interval would cause its length to increase while the transformations matrices operating on the left ventricle during the same interval would cause its length to decrease. This would not be the case if the heart were composed as a single structure. The 4-D model of the heart is generated by combining the 3-D basis objects and temporally varying the transformation matrices applied to each basis object at various instants in time during the cardiac cycle.

As stated above, the basis objects that are used to define the chest and the heart in the model 20B will primarily be analytical basis objects. However, if the entire cardiac cycle of the heart is to be represented by the 4-D model, another geometrical transformation operator that is needed to describe the complete motion of the heart is torsion. Torsion of the heart corresponds to the twisting motion of the heart during systolic contraction. Unfortunately, it is not possible to define one constant 4-by-4 matrix transformation operator that describes this motion. For example, in the situation where a basis object has torsion about the z-axis, the rotation of the object about the z-axis changes as a function of position over which the torsion occurs along the z-axis. Since the angular rotation is not constant for the object, this motion cannot be represented by a single transformation matrix, and thus the equations describing the basis objects cannot be solved using the approach previously discussed.

In accordance with the present invention, this type of motion is handled by utilizing polygonal basis objects for the structures of the model 20B that require torsion. The structures in the model 20B that experience torsion are the exterior right ventricular surface, the interior right ventricular surface, the exterior left ventricular surface, the interior left ventricular surface, and the coronary arteries. Actually, the left anterior descending coronary artery is the only artery that requires torsion. However, the right coronary artery and the left circumflex preferably are also comprised of polygonal basis objects, such as tapered toruses, in order to maintain consistency of the types of basis objects that are used to describe the particular components of the heart. The polygonal basis objects are comprised of polygons, each of which is defined by a plane equation that describes the plane defined by the polygon, which corresponds to the line segments that connect the vertices of the polygon together.

The manner in which the 3-D model of the heart (i.e., the model without the temporal component applied) is generated will now be described with reference to the preferred embodiment. The chest is assumed to be constant in width and length over the region of the chest that encloses the heart. Therefore, the chest (i.e., the human thorax) is modeled as a solid elliptical cylinder. The ribs are modeled as hollow elliptical cylinders which are tilted to appropriately model human anatomy and the lungs are modeled as a solid elliptical cylinder. The heart and the major vessels connecting to the heart are each comprised of several basis functions.

The chest wall, the ribs and the lungs are treated as being static during the cardiac cycle. Therefore, these anatomical features will not be provided with motion during simulation. These objects could be made to move so as to model human respiration. However, it is assumed that data acquisition occurs while the patient is holding his or her breath. In general, the major vessels do not move during the cardiac cycle. However, the connections of these vessels to chambers in the heart must produce an anatomically realistic model during the cardiac cycle. Therefore, in some cases, minor movement in the major vessels may be generated during simulations. In accordance with the preferred embodiment, the heart model is comprised of 4 prolate spheroids and 4 oblate spheroids.

The steps associated with generating the basis objects that define the left ventricle will be provided herein to provide an example of the manner in which model 20B can be constructed. The steps associated with manipulating the geometry of the left ventricle will be also described herein to demonstrate the manner in which the geometry of the model 20B can be manipulated. These steps can be carried out using, for example, the C++ programming language.

Figure 3:
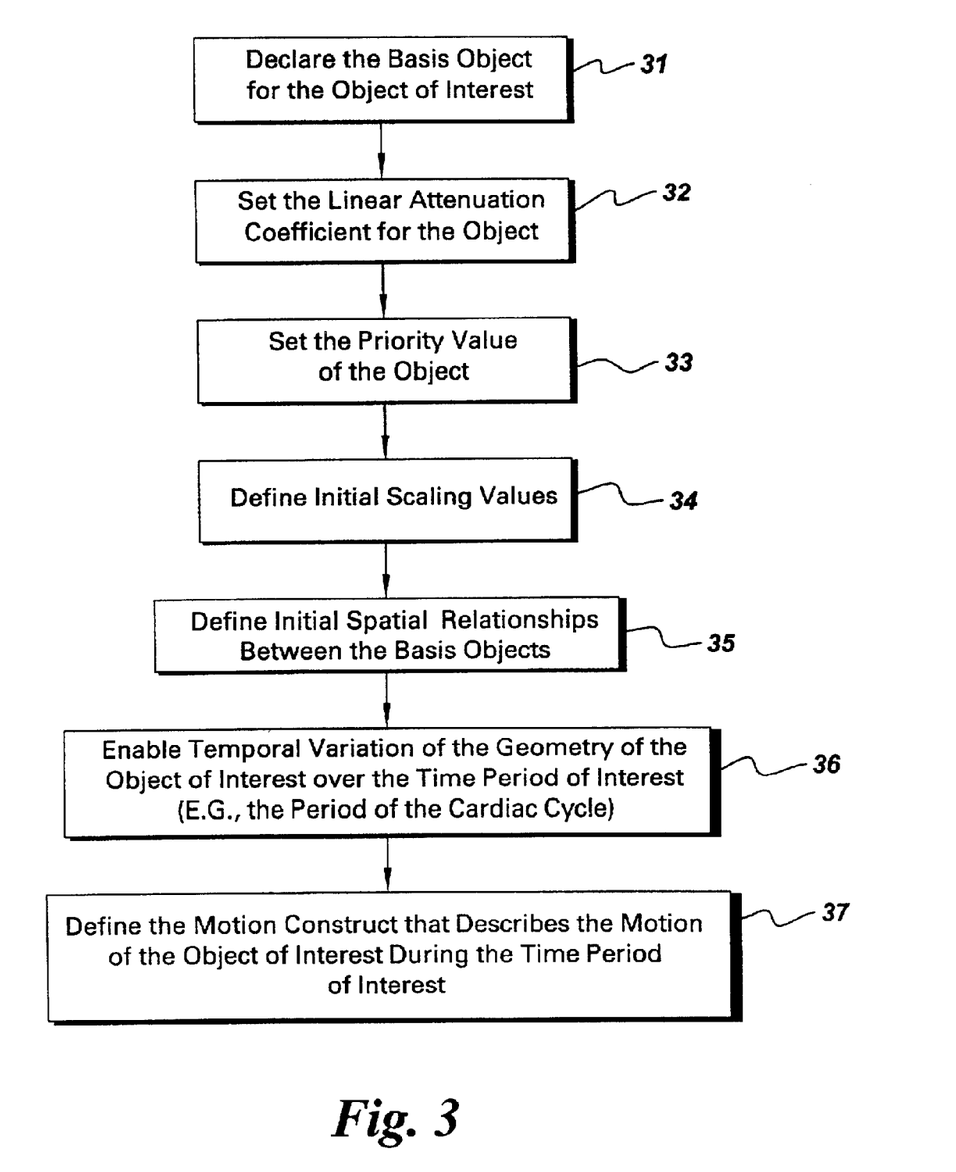
FIG. 3 is a flow chart illustrating the method of the present invention in accordance with the preferred embodiment for generating the model of the present invention.
Figure 4:
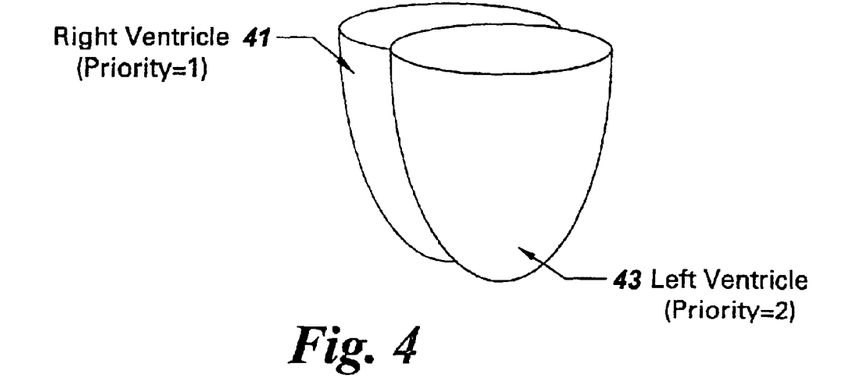
FIG. 4 is a drawing illustrating the intersecting relationship of the left and right ventricles of the heart.
Figure 5:
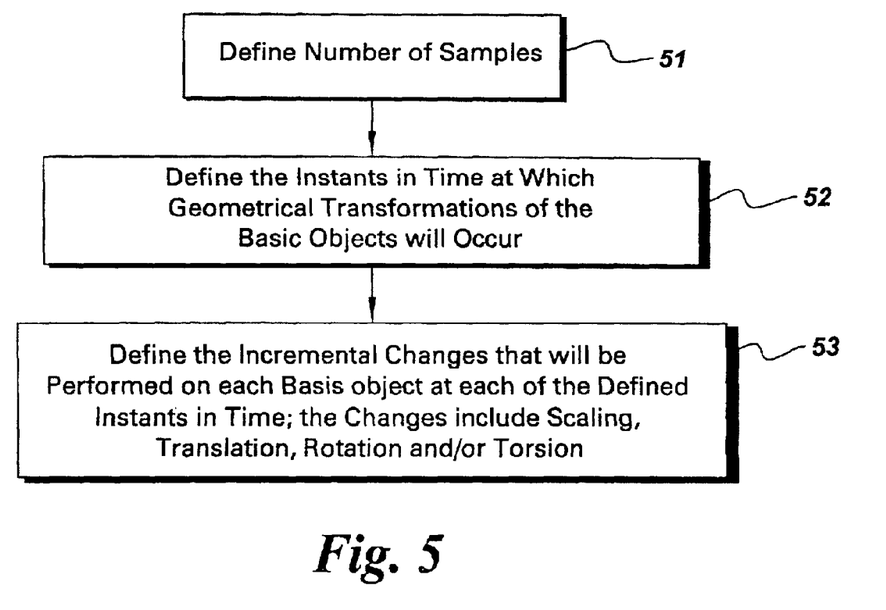
FIG. 5 is a flow chart illustrating the method of the present invention in accordance with the preferred embodiment for generating the motion construct that transforms the geometry of the model.

The process for generating and manipulating the basis objects will now be discussed with reference to FIGS. 3–5. The process of generating the model 20B will only be generally discussed and a specific exemplary embodiment for modeling the left ventricle of the heart will be described in detail. Those skilled in the art will understand, in view of this discussion, the manner in which the entire model of the heart 20B can be generated. The first step in the process of modeling the ventricle is to declare the basis object that is to be used to define the object, as indicated by block 31. In this example, the left ventricle is comprised of a pair of discrete ellipsoidal basis functions, which are prolate spheroids comprised of triangular segments. The discrete ellipsoids may be comprised of, for example, approximately 4000 triangles each. These discrete ellipsoids are polygonal basis objects. Polygonal basis objects are used in this example due to the fact that the interior and exterior left ventricular surfaces experience torsion during the cardiac cycle.

The linear attenuation coefficient associated with the ventricle is then set to a predefined value, as indicated by block 32. The linear attenuation coefficients will be integrated by the forward projection routine 20A during simulation. The priority value associated with the basis objects of the ventricle is then set to an appropriate value, as indicated by block 33. The priority value of a basis object is utilized by the forward projection routine 20A in determining which linear attenuation coefficient of intersecting regions of basis objects is to be selected for the ray emitted by the x-ray source and received by the detector array. In general, the 4 prolate spheroids and 4 oblate spheroids that comprise the heart all intersect. Therefore, a determination must be made as to which linear attenuation coefficient is to be used for the overlapping basis objects. This overlapping relationship is demonstrated by the drawing shown in FIG. 4. Specifically, FIG. 4 illustrates the overlap between the left ventricle 43 and the right ventricle 41.

Generally, the forward projection routine 20A determines the intersection time interval (i.e., the length of time that the ray that is within the basis objects) and chooses the linear attenuation coefficient of the basis object that has the highest priority if basis objects have overlapping intersection time intervals. As can be seen from FIG. 4, the basis objects of the left ventricle have been assigned a higher priority than the basis objects of the right ventricle. Therefore, in the intersecting region, the linear attenuation coefficient associated with the priority of 2, i.e., associated with the left ventricle, will be selected by the forward projection algorithm 20A for the path length of the rays that pass through the overlapping region in this example during simulation.

The initial scaling values that convert the ellipsoid to a prolate spheroid are then set, as indicated by block 34. A prolate spheroid is an ellipsoid that has a polar axis that is longer than the equatorial diameter of the ellipsoid, which corresponds to the geometry of the left ventricle. The spatial relationships between the basis objects that comprise the ventricle are then defined, as indicated by block 35. The temporal variation of the geometry of the ventricle over the time period of interest (e.g., the entire cardiac cycle) is then enabled, as indicated by block 36. The motion construct that describes the motion of the ventricle during the time period of interest is then defined, as indicated by block 37.

The step of defining the motion construct that describes the motion of the ventricle will be described in further detail with reference to FIG. 5. The first step is to define the number of temporal samplings of the position of the object that will correspond to one cardiac cycle, as indicated by block 51. For example, 9 samplings may be used to define the motion of the left ventricle as a function of time over a single cardiac cycle. Each sampling will correspond to one particular geometrical configuration of the model 20B at a particular point in time. The next step is to define the instants in time at which the geometric transformations of the basis objects will occur, as indicated by block 52. For example, each sampling will occur at a particular time with respect to the cardiac cycle. The step represented by block 52 synchronizes the timing of the samplings with the timing of the cardiac cycle.

Once the timing parameters have been defined, the geometrical changes that will occur in each basis object at each sampling time are defined, as indicated by block 53. These changes include scaling, translation, rotation, and torsion, if required. For each sampling time, each basis object will have a particular motion that is defined by a change in scaling and/or translation and/or rotation and/or torsion. In the case where torsion is experienced, the rotation of the basis object will vary depending on the position along the axis of the basis object about which the torsion occurs.

By generating a similar motion vector for each object of the heart, the heart can be made to move as a continuous object. It should be noted that the actual code used to generate the cardiac model will have several other additional operations that perform the tasks associated with moving the heart model to a reference position before scaling, translation, rotation and/or torsion are applied to the objects that comprise the heart model. Those operations have not been discussed herein in the interest of brevity as those skilled in the art will understand the manner in which these additional operations can be performed.

The priority of each basis object is chosen so that the composition of all the basis objects results in a realistic model of each of the chambers and coronary vessels of the heart, and the connecting major vessels. The motion construct is defined for each basis object at several instants during the cardiac cycle. The forward projection routine 20A updates the position of each basis object of the model 20B at each sampling time based on the original orientation of the object, the temporal variation of the object at that particular time, and the rotational position of the CT gantry.

As the forward projection routine 20A performs these tasks, it determines the intersection intervals of the ray emitted from the simulated x-ray source to the simulated detector array for each basis object of the model. Using the priority level of each basis object, the projection code selects the linear attenuation coefficient associated with the object having the highest priority level during that intersection interval and determines the line integral of the linear attenuation coefficient for that particular intersection interval. Each intersection interval is evaluated in this manner until the ray exits the model 20B. Upon exiting the model 20B, the line integral of the complicated geometric structures defined by the basis objects has been appropriately evaluated. These line integrals are processed in the manner discussed above with reference to FIG. 2 and an image of the model 20B is reconstructed.

It should be noted that the present invention has been described with reference to the preferred embodiments and that the present invention is not limited to these embodiments. Those skilled in the art will understand that variations and modifications may be made to the embodiments discussed above without deviating from the spirit and scope of the present invention.

What is claimed is:

1. A computer readable medium storing computer instructions for instructing computer to generate an image, the computer instruction comprising processing a mathematical model to generate an image, wherein the mathematical model comprises basis objects, each basis object being defined by a mathematical function, each basis object having a spatial relationship to all of the other basis objects, the basis objects and the spatial relationships between the basis objects defining a three-dimensional (3-D) geometry of the model, wherein the model is capable of being transformed by one or more transformation operators, each transformation operator being associated with a predetermined transformation operation, wherein when one of the transformation operators operates on one of the basis objects, the spatial relationship between the basis object that is operated on and at least one other basis object is varied, thereby causing the geometry of the model to be varied.

2. The computer readable medium of claim 1, wherein the basis objects are analytical basis objects, and wherein the mathematical function defining each basis object is a quadratic equation.

3. The computer readable medium of claim 1, wherein the basis objects are polygonal basis objects, each polygonal basis object corresponding to at least one polygon, each polygon having at least three vertices, the mathematical function defining each polygonal basis object describing a plane that is defined by line segments that connect the vertices of each polygon comprising the polygonal basis function.

4. The computer readable medium of claim 1, wherein at least one of the basis objects is an analytical basis object and wherein at least one of the basis objects is a polygonal basis object, the mathematical function defining each analytical basis object being a quadratic equation, and wherein each polygonal basis object is comprised of at least one polygon, each polygon having at least three vertices, the mathematical function defining each polygonal basis object describing a plane that is defined by line segments that connect vertices of each polygon comprising the polygonal basis object.

5. The computer readable medium of claim 1, wherein the transformation operations include scaling, translation, rotation and torsion, and wherein one or more of the transformation operations can be performed on the basis objects as a function of time to thereby cause the geometry of the model to be varied as a function of time.

6. The computer readable medium of claim 4, wherein the transformation operations include scaling, translation, rotation and torsion, and wherein one or more of the transformation operations can be performed on the basis objects as a function of time to thereby cause the geometry of the model to be varied as a function of time, and wherein the model includes information that describes the transformation operations that are to be performed on particular basis objects at particular instants in time, the transformation operations to be performed on particular basis objects occurring at particular instants in time such that the 3-D geometry of the model varies as a function of the time.

7. The computer readable medium of claim 4, wherein the model is a model of the human heart and thorax, and wherein the transformation operations include scaling, translation, rotation and torsion, and wherein one or more of the transformation operations can be performed on the basis objects as a function of time to thereby cause the geometry of the model to be varied as a function of time, and wherein the model includes information that describes the transformation operations that are to be performed on particular basis objects at particular instants in time in the cardiac cycle, the transformation operations to be performed on particular basis objects occurring at particular instants in time in the cardiac cycle such that the 3-D geometry of the model varies as a function of the timing of the cardiac cycle.

8. The computer readable medium of claim 1, wherein the transformation operations include scaling, translation, rotation, and torsion, and wherein one or more of the transformation operations can be performed on the basis objects as a function of time to thereby cause the geometry of the model to be varied as a function of time, and wherein the model includes information that describes the transformation operations that are to be performed on particular basis objects at particular instants in time, the transformation operations to be performed on particular basis objects occurring at particular instants in time such that the 3-D geometry of the model varies as a function of time, each basis object having a priority value associated therewith, each basis object having a linear attenuation coefficient associated therewith, the model including information identifying the priority value and the linear attenuation coefficient associated with each basis object.

9. The computer readable medium of claim 1, wherein the model is a model of the human heart and thorax, wherein the transformation operations include scaling, translation, rotation, and torsion, and wherein one or more of the transformation operations can be performed on the basis objects as a function of time to thereby cause the geometry of the model to be varied as a function of time, and wherein the model includes information that describes the transformation operations that are to be performed on particular basis objects at particular instants in time in the cardiac cycle, the transformation operations to be performed on particular basis objects occurring at particular instants in time in the cardiac cycle such that the 3-D geometry of the model varies as a function of the timing of the cardiac cycle, each basis object having a priority value associated therewith, each basis object having a linear attenuation coefficient associated therewith, the model including information identifying the priority value and the linear attenuation coefficient associated with each basis object.

10. A computer readable medium storing computer instructions for instructing computer to generate an image, the computer instruction comprising processing a mathematical model to generate an image of the human heart and thorax, wherein the mathematical model comprises basis objects, each basis object being defined by a mathematical function, each basis object having a spatial relationship to all of the other basis objects, the basis objects and the spatial relationships between the basis objects defining a three-dimensional (3-D) geometry of the model, wherein the model is capable of being transformed by one or more transformation operators, each transformation operator being associated with a predetermined transformation operation, wherein when one of the transformation operators operates on one of the basis objects, the spatial relationship between the basis object that is operated on and at least one other basis object is varied, thereby causing the geometry of the model to be varied.

11. The computer readable medium of claim 10, wherein the basis objects are analytical basis objects, and wherein the mathematical function defining each basis object is a quadratic equation.

12. The computer readable medium of claim 10, wherein the basis objects are polygonal basis objects, each polygonal basis object corresponding to at least one polygon, each polygon having at least three vertices, the mathematical function defining each polygonal basis object describing a plane that is defined by line segments that connect the vertices of each polygon comprising the polygonal basis function.

13. The medal computer readable medium of claim 10, wherein at least one of the basis objects is an analytical basis object and wherein at least one of the basis objects is a polygonal basis object, the mathematical function defining each analytical basis object being a quadratic equation, and wherein each polygonal basis object is comprised of at least one polygon, each polygon having at least three vertices, the mathematical function defining each polygonal basis object describing a plane that is defined by line segments that connect vertices of each polygon comprising the polygonal basis object.

14. The computer readable medium of claim 10, wherein the transformation operations include scaling, translation, rotation and torsion, and wherein one or more of the transformation operations can be performed on the basis objects as a function of time to thereby cause the geometry of the model to be varied as a function of time.

15. The computer readable medium of claim 13, wherein the transformation operations include scaling, translation, rotation and torsion, and wherein one or more of the transformation operations can be performed on the basis objects as a function of time to thereby cause the geometry of the model to be varied as a function of time, and wherein the model includes information that describes the transformation operations that are to be performed on particular basis objects at particular instants in time, the transformation operations to be performed on particular basis objects occurring at particular instants in time such that the 3-D geometry of the model varies as a function of the time.

16. The model computer readable medium of claim 13, wherein the transformation operations include scaling, translation, rotation and torsion, and wherein one or more of the transformation operations can be performed on the basis objects as a function of time to thereby cause the geometry of the model to be varied as a function of time, and wherein the model includes information that describes the transformation operations that are to be performed on particular basis objects at particular instants in time in the cardiac cycle, the transformation operations to be performed on particular basis objects occurring at particular instants in time in the cardiac cycle such that the 3-D geometry of the model varies as a function of the timing of the cardiac cycle.

17. The computer readable medium of claim 10, wherein the transformation operations include scaling, translation, rotation, and torsion, and wherein one or more of the transformation operations can be performed on the basis objects as a function of time to thereby cause the geometry of the model to be varied as a function of time, and wherein the model includes information that describes the transformation operations that are to be performed on particular basis objects at particular instants in time in the cardiac cycle, the transformation operations to be performed on particular basis objects occurring at particular instants in time in the cardiac cycle such that the 3-D geometry of the model varies as a function of the timing of the cardiac cycle, each basis object having a priority value associated therewith, each basis object having a linear attenuation coefficient associated therewith, the model including information identifying the priority value and the linear attenuation coefficient associated with each basis object.

* * * * *